(12) United States Patent
Hovis et al.

(10) Patent No.: US 7,533,818 B2
(45) Date of Patent: May 19, 2009

(54) BINARY CODE SYMBOL FOR NON-LINEAR STRAIN MEASUREMENT AND APPARATUS AND METHOD FOR ANALYZING AND MEASURING STRAIN THEREWITH

(75) Inventors: Gregory L. Hovis, Martinez, GA (US); William F. Ranson, Columbia, SC (US); Reginald I. Vachon, Atlanta, GA (US)

(73) Assignee: Direct Measurements Inc., Atlanta, GA (US)

( * ) Notice: Subject to any disclaimer, the term of this patent is extended or adjusted under 35 U.S.C. 154(b) by 489 days.

(21) Appl. No.: 11/167,558

(22) Filed: Jun. 28, 2005

(65) Prior Publication Data
US 2006/0289652 A1  Dec. 28, 2006

(51) Int. Cl.
*G06K 7/10* (2006.01)
(52) U.S. Cl. .............................. 235/462.09; 233/462.15
(58) Field of Classification Search ............ 235/462.01, 235/462.09, 462.15, 462.25
See application file for complete search history.

(56) References Cited

U.S. PATENT DOCUMENTS

| | | | |
|---|---|---|---|
| 3,474,237 A | 10/1969 | Hastings |
| 4,008,960 A | 2/1977 | Reyblatt |
| 4,014,613 A | 3/1977 | Sharpe, Jr. et al. |
| 4,050,818 A | 9/1977 | Sharpe, Jr. et al. |
| 4,288,852 A | 9/1981 | Holland |
| 4,591,996 A | 5/1986 | Vachon |
| 4,722,600 A | 2/1988 | Chiang |
| 4,939,354 A | 7/1990 | Priddy et al. |
| 4,969,106 A | 11/1990 | Vogel et al. |
| 5,053,609 A | 10/1991 | Priddy et al. |
| 5,065,331 A | 11/1991 | Vachon et al. |
| 5,124,536 A | 6/1992 | Priddy et al. |
| 5,442,729 A | 8/1995 | Kramer et al. |

(Continued)

FOREIGN PATENT DOCUMENTS

EP   0 921 371   6/1999

(Continued)

OTHER PUBLICATIONS

Patent Abstracts of Japan, vol. 006, No. 221 (P-153) (Nov. 5, 1982).

(Continued)

*Primary Examiner*—Daniel St.Cyr
(74) *Attorney, Agent, or Firm*—Jacobson Holman PLLC

(57) ABSTRACT

A binary code symbol for non-linear strain measurement designed specifically for perimeter-based deformation and strain analysis. The symbol is rectangular with a continuous outer perimeter, two data regions along adjacent sides of the rectangle and a utility region adjacent each side opposite the data regions. Each data region is made up of a number of data cells, and each utility region is made up of utility cells with alternating appearance. The inner half of the utility regions can be used to store auxiliary information and/or codes. There are two distinct finder cells on opposite corners of the rectangle, which can be used to orient the symbol. A non-linear strain gage for measuring the strain on an object under load in accordance includes a target, a sensor, and a computer, wherein the target is a binary code symbol.

18 Claims, 5 Drawing Sheets

U.S. PATENT DOCUMENTS

| | | | |
|---|---|---|---|
| 5,531,122 | A | 7/1996 | Chatham et al. |
| 5,671,042 | A | 9/1997 | Sciammarella |
| 5,691,527 | A * | 11/1997 | Hara et al. ................. 235/456 |
| 5,726,435 | A * | 3/1998 | Hara et al. ................. 235/494 |
| 5,726,907 | A | 3/1998 | Davidson et al. |
| 5,920,383 | A | 7/1999 | Chen et al. |
| 5,949,053 | A * | 9/1999 | Zlotnick ................. 235/462.09 |
| 6,000,614 | A | 12/1999 | Yang et al. |
| 6,023,334 | A | 2/2000 | Itagaki et al. |
| 6,028,889 | A * | 2/2000 | Gude et al. ................. 375/150 |
| 6,186,405 | B1 * | 2/2001 | Yoshioka ................. 235/494 |
| 6,189,356 | B1 | 2/2001 | Simeone et al. |
| 6,267,296 | B1 * | 7/2001 | Ooshima et al. ............ 235/487 |
| 6,718,269 | B2 | 4/2004 | Sinha |
| 6,863,218 | B2 | 3/2005 | Muramatsu |

| | | |
|---|---|---|
| 2004/0078421 | A1 | 4/2004 Routt |

FOREIGN PATENT DOCUMENTS

| | | |
|---|---|---|
| JP | 57 125803 | 8/1982 |
| JP | 2002 267422 | 9/2002 |

OTHER PUBLICATIONS

Patent Abstracts of Japan, vol. 2003, No. 01 (Jan. 14, 2003).
Timoshenko et al., Theory of Elasticity, McGraw-Hill Book Company, Inc., 1951, pp. 1-27.
Mathans et al., A White Paper on Two Dimensional Symbols Because you need information on the fly on and on the spot, 1966, pp. 1-71.
NASA Technical Handbook, Application of Data Matrix Identification Symbols To Aerospace Parts Using Direct Part Marking Methods/Techniques, NASA-HDBK-6003, 2001, pp. i-vi and 1-42.

* cited by examiner

FIG. 1A
FIG. 1B
FIG. 1C
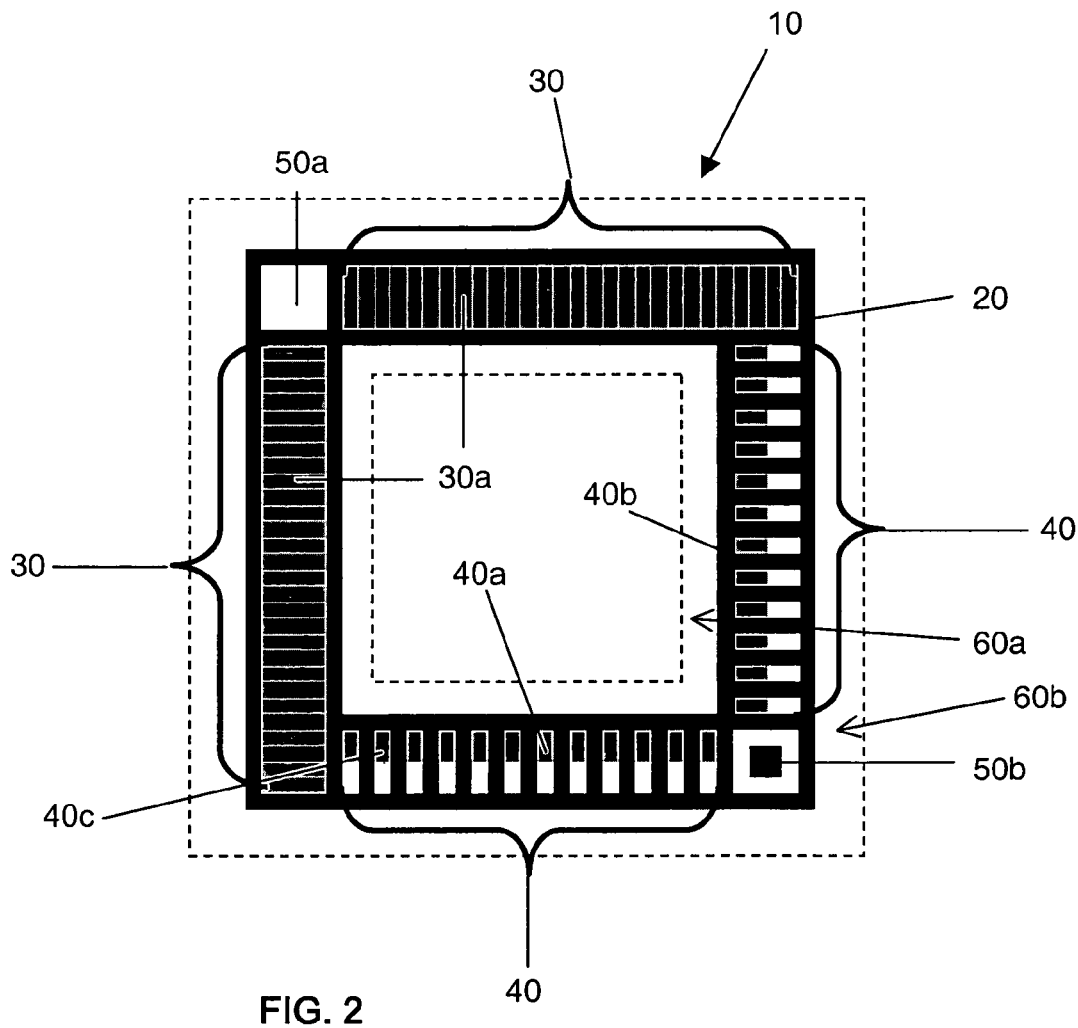
FIG. 2
| FIGURE 6A |
|---|
| FIGURE 6B |
FIG. 6

BINARY CODE SYMBOL FOR NON-LINEAR STRAIN MEASUREMENT AND APPARATUS AND METHOD FOR ANALYZING AND MEASURING STRAIN THEREWITH

BACKGROUND OF THE INVENTION

1. Field of the Invention

The present invention relates to a binary code symbol for non-linear strain measurement. More specifically, the invention relates to a binary code symbol for non-linear strain measurement, which can encode a range of data values using an error-correcting code (ECC) technique, and a strain analysis and measurement method employing the binary code symbol.

2. Related Art

There are numerous one-dimensional (1D) and two-dimensional (2D) symbols in use today, and most utilize a majority of the symbol's surface area to store the encoded information. These symbols are typically comprised of large, distinguishable blocks, dots, or bars called "cells" that enable data encoding. The spacing, relative size, state (i.e. black or white), or some combination of cell attributes is exploited to encode and decode data. These types of symbols are designed for inexpensive, low-resolution reading devices (or sensors); therefore cell dimensions can be relatively large with respect to the overall symbol size.

While many applications require that a symbol's encoded information be "read," there are additional applications that warrant a detailed accounting of the symbol's spatial characteristics. Metrology is one such application, which involves making precise geometric measurements of the symbol's features. Symbols optimized for "reading" purposes are not necessarily, nor are they normally, optimized for "metrology" purposes.

Examples of common symbols (a UPC symbol, a Data Matrix symbol, and a MaxiCode symbol) are provided in FIGS. 1A-1C. As shown in FIGS. 1A-1C, typical 1D and 2D symbols utilize cell arrangements that result in a broken (or non-continuous) symbol perimeter. Additionally, each has cells that are distributed somewhat uniformly across the entire symbol area. These characteristics are an efficient use of the symbol's surface area as a data encoder/decoder, but can cause a reduction in accuracy for certain types of deformation analyses, e.g. strain measurement.

Sensor resolution for machine-enabled metrology is typically higher than the sensor resolution required to simply encode and decode symbol information. Therefore with high-resolution sensors, it is possible to relax some of the "reader" requirements placed on existing symbol design, and produce symbols specifically for deformation/strain measurement.

It is to the solution of these and other problems that the present invention is directed.

SUMMARY OF THE INVENTION

It is accordingly a primary object of the present invention to provide a binary code symbol for non-linear strain measurement having a unique geometry and attributes.

It is another object of the present invention to provide a binary code symbol for non-linear strain measurement having features that enhance deformation and strain measurement.

It is still another object of the present invention to provide a binary code symbol for non-linear strain measurement that is designed specifically for perimeter-based deformation and strain analysis.

It is still another object of the present invention to provide a perimeter strain analysis method for use with a binary code symbol for non-linear strain measurement.

It is still another object of the present invention to provide a binary code symbol for non-linear strain measurement with near-perimeter data encoding.

It is another object of the present invention to provide a binary code symbol for non-linear strain measurement that can encode a range of data values using an error-correcting code ("ECC") technique.

These and other objects of the invention are achieved by the provision of a rectangular binary code symbol for non-linear strain measurement comprising a solid, continuous perimeter, first and second data regions along adjacent sides of the perimeter, first and second utility regions along adjacent sides of the perimeter opposite the first and second data regions, first and second finder cells at opposite corners of the rectangle, and inner and outer quiet regions distinguishing the first and second data regions, the first and second utility regions, and the first and second finder cells from their background. Each data region comprises a number of data cells, each data cell representing a single bit of binary data; and each utility region comprises a number of utility cells of alternating appearance.

In one aspect of the invention, the first and second utility regions of the binary code symbol can each have an inner half storing at least one of auxiliary information and codes.

In another aspect of the invention, the binary data represented by the data cells are encoded using an error-correcting code algorithm, for example, a Hamming 7-4 technique.

A non-linear strain gage in accordance with the invention comprises a target associated with an object for which at least one of strain and fatigue damage is to be measured, sensor means for pre-processing the detectable physical quantity emitted by the target and output data representing the physical quantity, the sensor means being compatible with the detectable physical quantity, means for analyzing the data output by the sensor means to define the binary code symbol, and means for measuring the strain on the object directly based on the pre-processed and analyzed data, wherein the target comprises a rectangular binary code symbol in accordance with the present invention.

In another aspect of the invention, the non-linear strain gage further comprises means for utilizing the strain measurement to provide information on at least one of fatigue damage and strain hysteresis for materials of known and unknown mechanical properties.

In a method of measuring strain on an object directly, in accordance with the present invention, the binary code symbol is associated with an object in such a way that deformation of the binary code symbol and deformation under load of the object bear a one-to-one relationship, wherein the binary code symbol emits a detectable physical quantity. The changes in the binary code symbol are identified as a function of time and change in the load applied to the object. The changes in the binary code symbol are then into a direct measurement of strain.

The binary code symbol in accordance with the present invention is based on monitoring the deformation of the geometry of the symbol based on using the fundamental concepts of non-linear stress analysis as developed by V. V. Novozhilov, *Foundations of the Nonlinear Theory of Elasticity*, Graylock Press, Rochester N.Y. 1953.

Other objects, features, and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 1A illustrates a conventional UPC symbol.

FIG. 1B illustrates a conventional Data Matrix symbol.

FIG. 1C illustrates a conventional MaxiCode symbol.

FIG. 2 illustrates an exemplary layout of a rectangular binary code symbol in accordance with the present invention.

FIG. 6 shows the arrangement of FIGS. 6A and 6B.

DETAILED DESCRIPTION OF THE PREFERRED EMBODIMENTS

Figure 3:
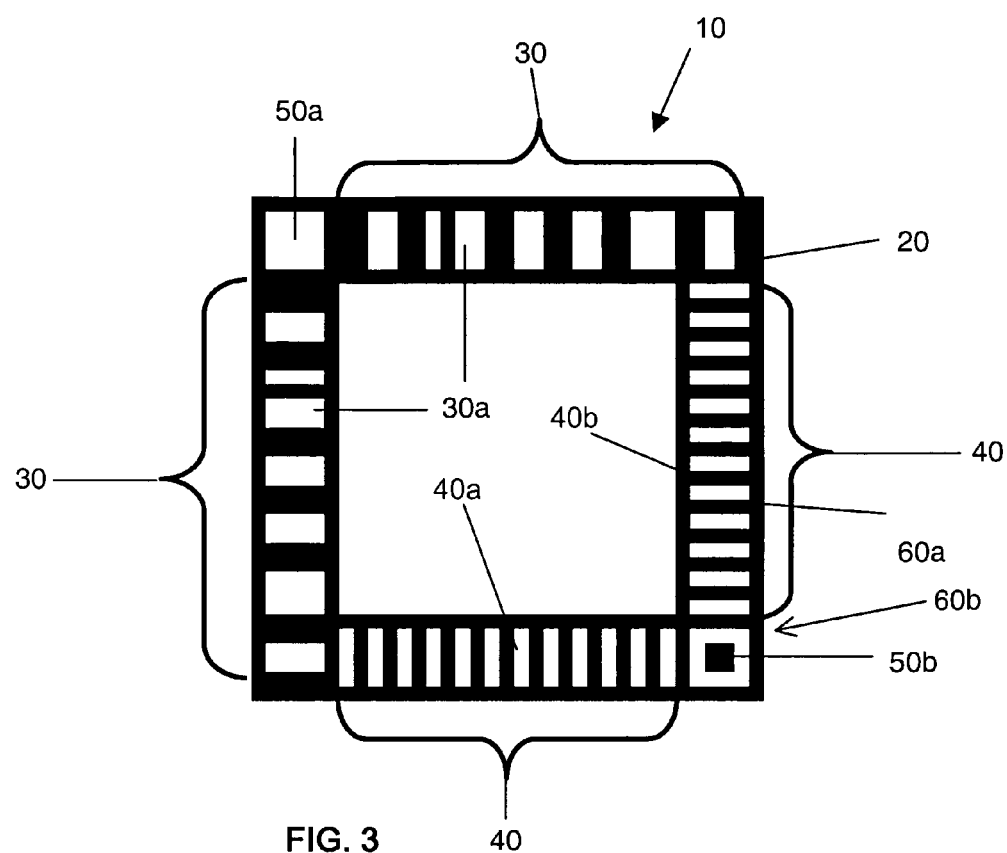
FIG. 3 illustrates an exemplary binary code symbol in accordance with the present invention with the number 27,097 encoded.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

A binary code symbol for non-linear strain measurement in accordance with the present invention is designed specifically for perimeter-based deformation and strain analysis, while providing for robust, self-checking/self-correcting data encoding. Specific geometric features of the symbol are optimized for perimeter-based, non-linear strain measurement using discrete or analog deformation analysis methods.

The binary code symbol for non-linear strain measurement in accordance with the present invention is distinctly, materially, and theoretically different than the symbolic strain rosette ("SSR") as defined in U.S. patent application Ser. No. 10/223,680, filed Aug. 20, 2002 and published as U.S. publication No. 2004-0036853, inasmuch as the binary code symbol in accordance with the present invention is not based on utilizing a strain rosette and can measure non-linear strain, which the SSR cannot.

The binary code symbol in accordance with the present invention is rectangular in shape; has a solid, continuous outer perimeter, and enables data encoding near the symbol's perimeter. This unique combination of attributes significantly increases both the quantity and quality of distantly-spaced symbol features. These unique characteristics enable high-accuracy deformation analysis using discrete or analog techniques. Data is encoded in proportionately smaller regions of the symbol (compared to current symbols) therefore a higher resolution sensor is required to read and analyze the symbol.

A typical layout of a rectangular symbol is shown in FIG. 2. In the embodiment of FIG. 2, the rectangular symbol 10 is square in shape, with the characteristic solid, continuous outer perimeter 20. In the example shown in FIG. 2, the symbol 10 also has a solid, continuous inner perimeter, although in general, a solid, continuous inner perimeter is not required. There are two data regions 30 along adjacent sides of the rectangle. Each data region 30 is made up of a number of data cells 30a. The symbol 10 in FIG. 2 has twenty-eight data cells 30a per data region 30; however no particular limit is placed on the number of data cells 30a per data region 30. In the case of symbols that are symmetric about a diagonal of the rectangle, the data regions can be identical to one another for encoded-data redundancy. Opposite each data region 30 along a side of the rectangle is a utility region 40. Utility regions 40 are made up of utility cells 40a and 40b with alternating appearance (i.e. foreground, background, foreground, etc.) Utility regions 40 assist in symbol location, orientation, and analysis. In addition, the inner half 40c of the utility regions 40 can be used to store auxiliary information and/or codes (e.g. vendor ID, application ID, function ID, version information, date/time, materials ID/info, etc.) There are two distinct finder cells 50a and 50b on opposite corners of the rectangle, which can be used to orient the symbol 10. Inner and outer quiet regions 60a and 60b are designated whereby the data regions 30, the utility regions 40, and the finder cells 50a and 50b can be distinguished from their background. It is noted that in FIG. 2, broken lines are used to show the boundaries of the inner and outer quiet regions 60a and 60b, but that in practice, the symbol 10 does not actually include these broken lines.

The two data regions 30 have inner sides inwardly offset from the outer perimeter 20, and the two utility regions 40 have inner sides inwardly offset from the outer perimeter. The inner perimeter is defined by the inner sides of the two data regions 30 and the two utility regions 40. The outer quiet region 60b is outward of the outer perimeter 20 and the inner quiet region 60a is inward of the inner perimeter.

In a binary code symbol in accordance with the present invention, information is encoded via the symbol's data cells. An individual data cell represents a single bit of information; that is, its state is either "on" or "off" (i.e. "1" or "0"). The order and state of individual bit values combine to represent an encoded data value. The binary contribution of a single data cell is indicated by the cell's state, which is determined by a sensor. Data cells that have the same appearance as the symbol's background (or quiet region) are considered "on" or bit value "1." Data cells that have the same appearance as the foreground (or perimeter) are considered "off" or bit value "0."

An example symbol is shown in FIG. 3. This symbol has the data value 27,097 encoded in its data regions using an error-correction code (ECC) technique. The data value is encoded redundantly in the top and left data regions 30 (i.e. the two data regions are identical). In the FIG. 3 example, the foreground is colored black, and the background is colored white. However, there are no restrictions placed on cell foreground and background appearance except that sufficient contrast is provided to enable a sensor to determine cell state.

Figure 4:
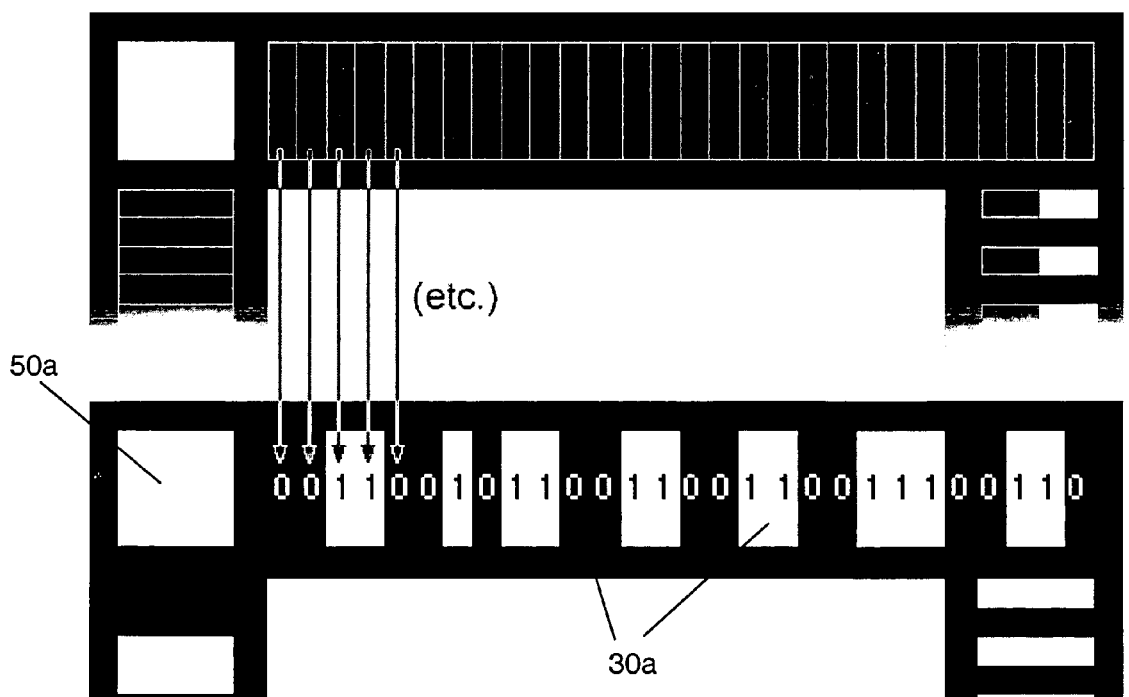
FIG. 4 illustrates the binary state of data cells in the first data region of the binary code symbol of FIG. 3.

Using the foreground and background appearance rules above, the binary state information in the data cells 30 of the binary code symbol of FIG. 3 is illustrated in FIG. 4. The binary state of each data cell 30a, read left to right, is: 0,0,1, 1,0,0,1,0,1,1,0,0,1,1,0,0,1,1,0,0,1,1,1,0,0,1,1,0. This string of zeros and ones can be converted to the decimal number 27,097 using a reverse application of the Hamming 7-4 technique (i.e. decoding), as discussed in greater detail hereinafter.

It is desirable that encoded data be somewhat "self correcting" in the event that part of the symbol is damaged, scratched, or otherwise degraded. Therefore, the binary data in each data region of the symbol is encoded using an error-correcting code (ECC) algorithm. The ECC algorithm combines vector-space mathematics and set theory to convert numeric quantities into encoded values that provide limited self-checking and self-correcting capability during decoding. The use of ECC algorithms plus data redundancy provides for robust encoding and limited protection against data loss.

Using redundancy and ECC methods, the symbol in FIG. 3, with 28 data cells per data region, can encode any data value in the range 0 to 65,535. If redundancy were not used, the data capacity of the symbol in FIG. 3 would increase to over 4-billion possible data values.

The ECC algorithm used is a Hamming 7-4 technique. This encoding method takes the original data value (un-encoded) and breaks it into 4-bit "words." Each 4-bit word is encoded into a 7-bit word containing the original value and three "check bits." This method permits the original 4-bit word to be recovered in the event that the sensor cannot determine the state of one of the 7-bit word's bits. Therefore, the original data value can be recovered if up to one bit in each word is lost.

The Hamming technique used has an encoding "efficiency" of 0.571. This is calculated as the ratio of the number of original bits ($N_1$) to the number of encoded bits ($N_2$). For the example in FIG. 3, $N_1$=16 and $N_2$=28, giving:

$$E = \frac{N_1}{N_2} = \frac{16}{28} = 0.571$$

Therefore the data capacity (or number of unique combinations of data values) for a single data region in a symbol that uses ECC encoding, expressed in terms of the number of data cells per region ($N_2$) is roughly:

$$C = 2^{N_2 \cdot E}$$

The symbol is specifically designed to enable high-accuracy deformation analysis. The symbol's solid perimeter and perimeter-encoding technique are unique attributes that significantly increase both the quantity and quality of distantly-spaced symbol features. These qualities improve the accuracy of deformation analyses using discrete or analog machine-enabled techniques.

Deformation analysis can provide a detailed accounting of the symbol's spatial characteristics under various conditions. For instance, deformation analysis can mathematically describe geometric changes from some reference state to some subsequent state (e.g. a change in size, shape, symmetry, etc.).

Strain measurement is one useful product of deformation analysis. Strain is a unitless mechanical property defined as a change in length per unit length.

Figure 5:
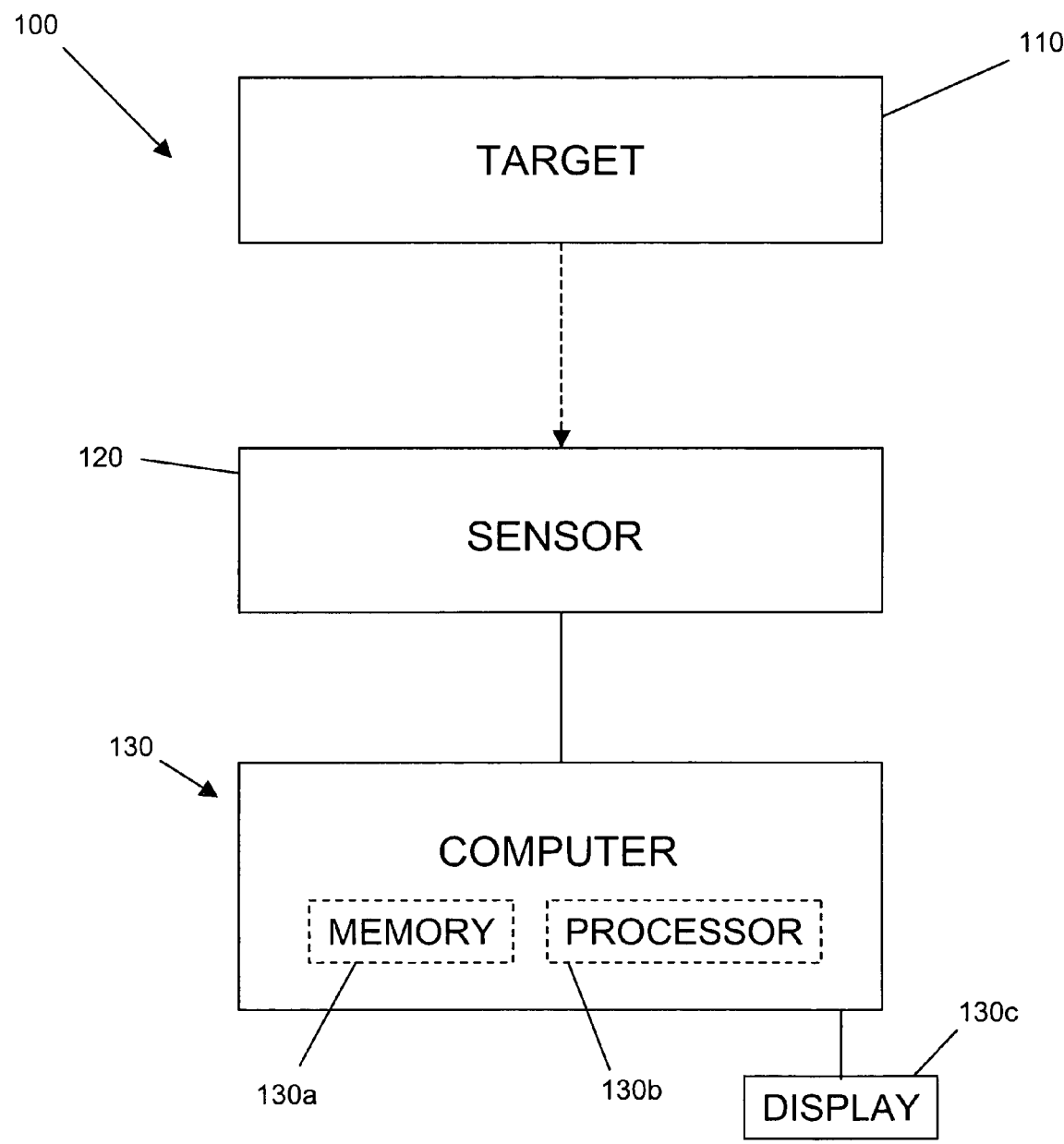
FIG. 5 is a diagrammatic view of a non-linear strain gage in accordance with the present invention.

Referring now to FIG. 5, there is shown diagrammatically a non-linear strain gage 100 for measuring the strain on an object under load in accordance with the present invention, comprising a target 110, a sensor 120, and a computer 130, wherein the target 110 is a binary code symbol in accordance with the present invention, which has been manufactured or identified. The binary code symbol can be composed of a plurality of sub-images, each of which has a centroid, and can be monitored by the sensor 120 to correlate the movement of sub-image centroids associated with rectangular elements formed in the data regions 30 of the binary code symbol.

The target 110 can be associated with an object by any means that results in the deformation of the binary code symbol with the deformation under load. The deformation of the binary code symbol and the object must bear a one-to-one relationship. The target 110 can be associated with an object for which strain is to be measured by applying it directly or indirectly to the surface of the object, or by identifying it in a pre-existing pattern that defines a binary code symbol. Whether applied or identified, the target 110 can be embedded in the object for which strain is to be measured.

Examples of application of a target 110 include, but are not limited to:

(1) Application to a medium such as a polymide film that is bonded, for example by gluing, to the surface of the object for which strain is to be measured (indirect application);

(2) Etching on a surface (direct application);

(3) Painting on surface (direct application); and (4) Printing on a surface (direct application).

Target applications are described in detail in NASA STD 6002 and Handbook 6003.

Examples of identification of a target 110 include, but are not limited to:

(1) Identification by observing naturally-occurring surface features of the object that define a binary code symbol on a macroscopic or microscopic scale (including as an example, but not limited to, features on the surface of the earth).

(2) Identification by observing naturally-occurring subsurface features of the object that define a binary code symbol on a macroscopic or microscopic scale (including as an example, but not limited to, a fossil buried in the earth).

(3) Identification by observing manmade surface features of the object that define a binary code symbol on a macroscopic or microscopic scale (including as an example, but not limited to, a collection of components).

(4) Identification by observing manmade subsurface features of the object that define an binary code symbol on a macroscopic or microscopic scale (including as examples, but not limited to, structural elements of a spacecraft covered with a skin, the structural elements of a bridge covered with a skin, or the structural elements of a building having a surface opaque in the visible spectrum).

Examples of embedding of a target 110 include, but are not limited to:

(1) Embedding in the object to be studied when the object is being formed;

(2) Identification of naturally occurring or manufactured subsurface features;

(3) Covering with an overlying material, such as one or more layers of paint; and (4) Implanting in a human body, in a body part or an implant. For example, if the target 110 is affixed to a critical area of a hip joint or a hip implant, or to an artificial heart valve, the target 110 can be viewed through the tissue surrounding the target 110 by an x-ray sensor 120, and the strain and fatigue damage to the associated body part or implant can be assessed over time.

The target 110 can naturally emit a detectable physical quantity, create a detectable physical quantity, or reflect a detectable physical quantity. The detectable physical quantity can be a signal in any portion of the electromagnetic spectrum (including the audio frequency range), or it can be a field such as a magnetic field. The detectable physical quantity can be a signal that can be characterized as a gray-scale image that can be converted into a bitmap file. Sensors that will sense various detectable physical quantities, including all these signals and fields, are commercially available.

The target 110 is scalable, in that it can be produced and sensed on a scale ranging from microscopic to macroscopic. Thus, the non-linear strain gage 100 in accordance with the present invention is applicable to very large applications such as viewing a target 110 on earth from space to determine displacements/strain of the earth's surface or subsurface strains. All that is required is to match the sensor 120 to the scale or scope of the target and the detectable physical quantity emitted by the target 110.

One advantage of the non-linear strain gage 100 is that strain is measured directly, as opposed to being inferred from secondary measurements using analog techniques; thus making possible an explicit detectable "reading" of normal and shear strain components. This in turn leads to greater accuracy and reduced system errors.

Another advantage of the non-linear strain gage 100 is that the range of strain measurements is easily from 0 to at least 50%, which permits measurements of strain in elastic materials such as rubber and plastic. The potential exits to cover measurements at the nanoscale level.

A third, and major advantage of the non-linear strain gage 100 is that subsurface strains can be measured. Subsurface measurements can have special applications in man-made composites.

The non-linear strain gage 100 also can be used in the assessment of fatigue damage (accumulation) in critical areas of structures or components of devices subjected to cyclic or other loadings. This is accomplished by observing the area of a component under study over a selected period of time during the normal usage of the area. The data can then be used to assist in component lifecycle management.

The sensor 120 observes the deformation of a target 110 affixed to a surface or embedded in a material by capturing the total image of the target 110 and transmitting it to the computer 130. The sensor 120 is selected to be compatible with the detectable physical quantity emitted by the target 110 and undertakes some pre-processing of the observed physical quantity to provide data representing the physical quantity to the computer 130. In the case of a binary code symbol that can be monitored optically, the input signal to the sensor 120 may be a grayscale image that can be converted into a bitmap file, although other inputs can be accommodated.

The computer 130 conventionally comprises memory 130*a* for storing programs and data and a processor 130*b* for implementing the programs and processing the data, and is associated with a display 130*c* for displaying data. As the object under study is submitted to loading resulting in strain, the computer 130 implements programs that (1) identify the binary code symbol and the changes therein as a function of time and change in the load, (2) translate the changes in the binary code symbol into strain, and (3) display it in a suitable format. The display of the data can take place in real time. The technology is scalable with respect to the size of the object under study.

The binary code symbol is monitored—by optical, magnetic, electromagnetic, acoustic, or other sensor 120, as appropriate—at successive periods of time, either on a continuous time, at random times triggered by an external event, or on a programmed time basis. The sub-images of the binary code symbol are correlated over time to detect the movement of the centroids of the sub-images, and the movements are quantified and utilized in analytical expressions to determine strain in the directions of the coordinate system used corresponding to the plane of the surface under study. The movement of the centroids is detected by a program implemented by the computer 130 in accordance with the present invention, which identifies the binary code symbol and its sub-images, correlates the sub-images of the binary code symbol over time, determines the displacement of the centroids of the sub-images of the binary code symbol, and utilizes the data obtained as input for strain equations as described hereinafter and to yield and display strain in two dimensions.

Figure 6A:
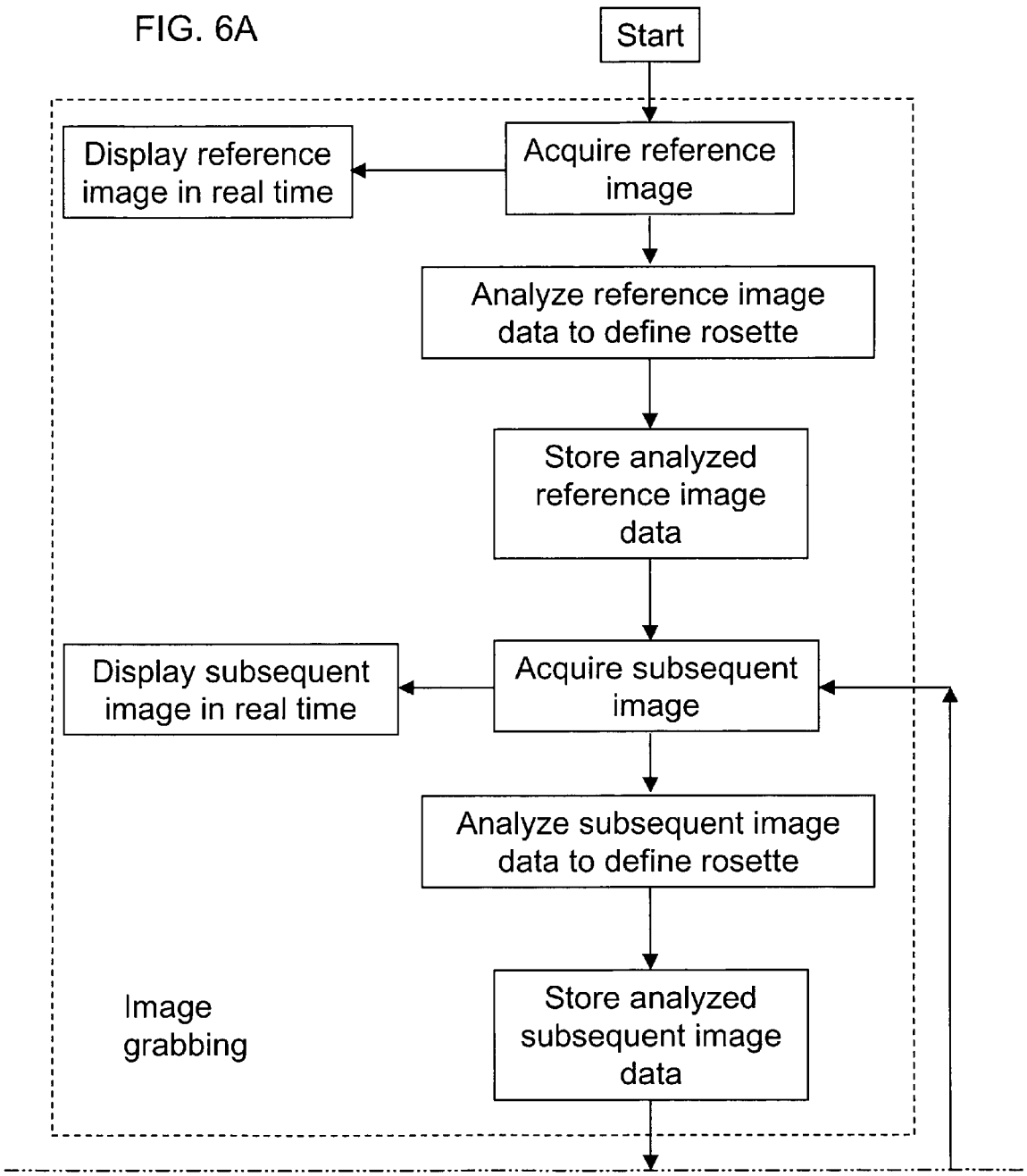
FIGS. 6A and 6B together are a high level flow diagram illustrating the algorithm followed by the computer program in accordance with the present invention.
Figure 6B:
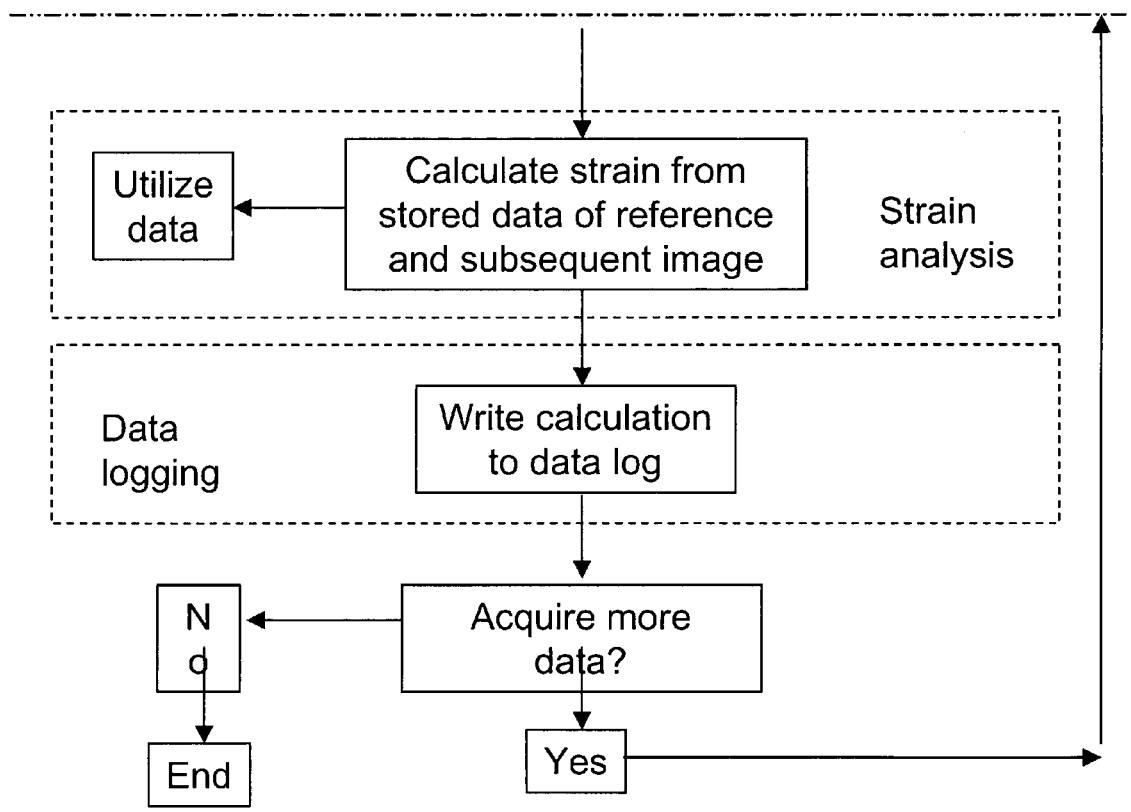

Referring now to FIGS. 6A and 6B together, there are shown a high level flow diagram illustrating the algorithm followed by the computer programs in accordance with the present invention. The algorithm comprises three basic stages, image grabbing, strain analysis, and data logging; and utilizes two types of images, a reference image, acquired either without application of a load or with a reference load on the object for which strain is to be measured, and subsequent images, acquired after the reference image in the presence of a load or change to the load on the object.

The image grabbing stage comprises the following steps: The sensor 120 acquires the reference image and outputs data representing the reference image to the computer 130. A program or programs implemented by the computer 130 then analyzes the reference image data to define an binary code symbol, and concurrently displays the reference image, preferably in real time, on a computer monitor or other display device 130*c*. Following the analysis step, the computer 130 stores the analyzed reference image data. Once the reference image has been acquired, analyzed, and stored, the sensor 120 acquires a subsequent image and outputs data representing that subsequent image (that is, the current subsequent image) to the computer 130.

Acquisition of subsequent images can take place either continuously or at predetermined intervals, or it can be triggered by an external event such as the application of a load. The number of subsequent images thus can range from one to thousands. Once data representing a subsequent image is input to the computer 130, the program analyzes it to define a binary code symbol, and concurrently displays the corresponding subsequent image, preferably in real time, on a computer monitor or other display device (preferably on the same monitor or other display device 130*c* on which the reference image is being displayed, to facilitate comparison). Following the analysis step, the computer 130 stores the analyzed subsequent image data for the current subsequent image.

The strain analysis stage takes place following the image grabbing stage, and is carried out each time a subsequent image is acquired. In the strain analysis stage, the computer 130 calculates the strain from the stored reference image data and the stored subsequent image data for the current subsequent image, based on the changes in the binary code symbol as a function of time and change in the load. Thus, a new strain calculation is made for each subsequent image. The strain calculation can then be utilized as a display, as well as providing information on fatigue damage or strain hysteresis for materials of known and unknown mechanical properties, and data that can be used to assist in component lifecycle management.

The data logging stage takes place following each iteration of the strain analysis stage. In the data logging stage, the program gets the current results and writes them to a log file.

As will be appreciated by those of skill in the art, the flow diagram of FIGS. 6A and 6B is for purposes of illustration, and some changes can be made in the algorithm without affecting the results. For example, the display of the reference and subsequent images can take place sequentially with the analysis of those images, as well as substantially concurrently; the acquisition and display of the reference and/or the subsequent images can be initiated by an external event; and images can be recorded during an event and stored for processing at a later time.

To measure strain using the symbol, a sensor is used to collect a discrete or analog representation of the symbol's geometry. Sensor data is used to perform a deformation analysis on the symbol at two or more deformation states.

This analysis mathematically describes the geometric deformation, and these results can be used to calculate strain.

It is to be understood that the present invention is not limited to the illustrated user interfaces or to the order of the user interfaces described herein. Various types and styles of user interfaces may be used in accordance with the present invention without limitation.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A rectangular binary code symbol for non-linear strain measurement, comprising:
    a solid, continuous outer perimeter;
    first and second data regions along adjacent sides of the outer perimeter, each data region comprising a number of data cells, each data cell representing a single bit of binary data, the first and second data regions having inner sides inwardly offset from the outer perimeter;
    first and second utility regions along adjacent sides of the outer perimeter opposite the first and second data regions, each utility region comprising a number of utility cells of alternating appearance, the first and second utility regions having inner sides inwardly offset from the outer perimeter;
    an inner perimeter defined by the inner sides of the first and second data regions and the first and second utility regions;
    first and second finder cells at opposite corners of the rectangle; and
    inner and outer quiet regions distinguishing the first and second data regions, the first and second utility regions, and the first and second finder cells from their background, the outer quiet region being outward of the outer perimeter and the inner quiet region being inward of the inner perimeter.

2. The binary code symbol of claim 1, wherein the first and second utility regions each have an inner half storing at least one of auxiliary information and codes.

3. The binary code symbol of claim 1, wherein the symbol is symmetric and the first and second data regions are identical to one another for encoded-data redundancy.

4. The binary code symbol of claim 1, wherein the binary data represented by the data cells are encoded using an error-correcting code algorithm.

5. The binary code symbol of claim 4, wherein the error-correcting code algorithm combines vector-space mathematics and set theory to convert numeric quantities into encoded values that provide limited self-checking and self-correcting capability during decoding.

6. The binary code symbol of claim 5, wherein the algorithm used is a Hamming 7-4 technique.

7. A non-linear strain gage comprising:
    a target associated with an object for which at least one of strain and fatigue damage is to be measured and emitting a detectable physical quantity, the target comprising a rectangular binary code symbol for non-linear strain measurement, the binary code symbol including:
        a solid, continuous perimeter;
        first and second data regions along adjacent sides of the perimeter, each data region comprising a number of data cells, each data cell representing a single bit of binary data;
        first and second utility regions along adjacent sides of the perimeter opposite the first and second data regions, each utility region comprising a number of utility cells of alternating appearance;
        first and second finder cells at opposite corners of the rectangle; and
        inner and outer quiet regions distinguishing the first and second data regions, the first and second utility regions, and the first and second finder cells from their background;
    sensor means for pre-processing the detectable physical quantity emitted by the target and output data representing the physical quantity, the sensor means being compatible with the detectable physical quantity;
    means for analyzing the data output by the sensor means to define the binary code symbol; and
    means for measuring the strain on the object directly based on the pre-processed and analyzed data.

8. The non-linear strain gage of claim 7, further comprising means for utilizing the strain measurement to provide information on at least one of fatigue damage and strain hysteresis for materials of known and unknown mechanical properties.

9. The non-linear strain gage of claim 7, further comprising means for utilizing the strain measurement to assist in component lifecycle management.

10. The non-linear strain gage of claim 7, further comprising means for utilizing the strain measurement based on collected damage accumulation data.

11. The non-linear strain gage of claim 7, wherein the binary code symbol is defined a priori by manufacture.

12. The non-linear strain gage of claim 7, wherein the target is identified in a pre-existing pattern that defines the binary code symbol.

13. A method of measuring strain on an object directly, comprising the steps of:
    associating a binary code symbol with an object in such a way that deformation of the binary code symbol and deformation under load of the object bear a one-to-one relationship, wherein the binary code symbol emits a detectable physical quantity and includes:
        a solid, continuous perimeter;
        first and second data regions along adjacent sides of the perimeter, each data region comprising a number of data cells, each data cell representing a single bit of binary data;
        first and second utility regions along adjacent sides of the perimeter opposite the first and second data regions, each utility region comprising a number of utility cells of alternating appearance;
        first and second finder cells at opposite corners of the rectangle; and
        inner and outer quiet regions distinguishing the first and second data regions, the first and second utility regions, and the first and second finder cells from their background;
    identifying the changes in the binary code symbol as a function of time and change in the load applied to the object; and
    translating the changes in the binary code symbol into a direct measurement of strain.

14. The method of claim 13, wherein the binary code symbol is defined a priori by manufacture and the associating step comprises applying the binary code symbol to the object.

15. The method of claim 13, wherein the associating step comprises identifying the binary code symbol a priori.

16. The method of claim 13, further comprising the step of utilizing the strain measurement to provide information on at least one of fatigue damage and strain hysteresis for materials of known and unknown mechanical properties.

17. The method of claim 13, further comprising the step of utilizing the strain measurement to assist in component life-cycle management.

18. The method of claim 13, further comprising the step of utilizing the strain measurement based on collected damage accumulation data.

* * * * *